(12) United States Patent
Amari

(10) Patent No.: US 11,671,173 B2
(45) Date of Patent: Jun. 6, 2023

(54) OPTICAL TRANSCEIVER AND METHOD FOR CONTROLLING OPTICAL TRANSCEIVER

(71) Applicant: SUMITOMO ELECTRIC INDUSTRIES, LTD., Osaka (JP)

(72) Inventor: Shogo Amari, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/649,583

(22) Filed: Feb. 1, 2022

(65) Prior Publication Data
US 2022/0255622 A1 Aug. 11, 2022

(30) Foreign Application Priority Data

Feb. 5, 2021 (JP) .............................. JP2021-017469
Jan. 21, 2022 (JP) .............................. JP2022-008005

(51) Int. Cl.
| | | |
|---|---|---|
| H04B 10/07 | (2013.01) | |
| H04B 17/00 | (2015.01) | |
| H04B 10/079 | (2013.01) | |
| H04L 1/1607 | (2023.01) | |
| H04B 10/40 | (2013.01) | |

(52) U.S. Cl.
CPC ......... *H04B 10/0791* (2013.01); *H04B 10/40* (2013.01); *H04L 1/1614* (2013.01)

(58) Field of Classification Search
CPC .. H04B 10/077; H04B 10/0791; H04B 10/40; H04B 2210/07
See application file for complete search history.

(56) References Cited

U.S. PATENT DOCUMENTS

2016/0277104 A1* 9/2016 Kim .................... H04B 10/0773
2017/0353268 A1* 12/2017 Jung ....................... H04J 14/02

FOREIGN PATENT DOCUMENTS

| JP | 2016-072848 | 5/2016 |
|---|---|---|
| JP | 2018-514982 | 6/2018 |
| JP | 2018-520561 | 7/2018 |
| KR | 20180054997 A * | 5/2018 |
| WO | 2016/154004 | 9/2016 |
| WO | 2016/187445 | 11/2016 |

* cited by examiner

*Primary Examiner* — Pranesh K Barua
(74) *Attorney, Agent, or Firm* — IPUSA, PLLC

(57) ABSTRACT

An optical transceiver, for receiving an optical signal on which a monitor signal is superimposed, includes: an extractor configured to extract the monitor signal from the optical signal received; and a reception processor configured to reproduce a monitor data from the monitor signal extracted by the extractor.

11 Claims, 5 Drawing Sheets

FIG.2

FRAME FORMAT OF MONITOR DATA (256 BYTES)

| HEADER SECTION | FRAME NUMBER SECTION | PAYLOAD SECTION | CHECKSUM SECTION |
|---|---|---|---|
| 2 BYTES | 1 BYTE | 251 BYTES | 2 BYTES |

OPTICAL TRANSCEIVER AND METHOD FOR CONTROLLING OPTICAL TRANSCEIVER

CROSS-REFERENCE TO RELATED APPLICATIONS

The present application is based on and claims priority to Japanese Patent Application No. 2021-017469 filed on Feb. 5, 2021, and Japanese Patent Application No. 2022-008005 filed on Jan. 21, 2022, the contents of which are incorporated herein by reference in their entirety.

BACKGROUND OF THE INVENTION

Field of the Invention

The disclosures herein generally relate to an optical transceiver and a method for controlling an optical transceiver.

Description of the Related Art

An optical transceiver extracts monitor and control data from, for example, a low speed signal superimposed on a received high speed optical signal. The extracted monitor and control data is used to monitor and control optical transceivers and optical networks. The optical transceiver also transmits slow monitor and control data superimposed on a high speed optical signal, for monitoring and controlling (see, for example, Japanese Translation of PCT International Application Publication No. JP-T-2018-520561, and Japanese Translation of PCT International Application Publication No. JP-T-2018-514982).

In parallel, for example, a frame synchronization device determines whether input data and a synchronization pattern are consecutively matched for a plurality of matched timings of the input data and the synchronization pattern, in a period of a frame length. The frame synchronization device performs frame synchronization of the input data based on the determination result (see, for example, Japanese Unexamined Patent Application Publication No. 2016-072848).

SUMMARY OF THE INVENTION

For example, the frame size is 6 bytes (48 bits) in the HTMC (Head to Tail Message Channel) frame of ITU-T (International Telecommunication Union Telecommunication Standardization Sector) Recommendation G.698.4. In the HTMC frame, the ratio of the data body (message) to the frame length is 50%, and the size of the data body is 3 bytes (24 bits). The section of the frame in which the data body is stored is also called a payload. For example, when monitor data is transmitted between optical transceivers, the ratio of the size of the payload to the frame size is preferably large in order to improve the transmission efficiency of the monitor data.

For example, in SONET (synchronous optical network)/SDH (Synchronous Digital Hierarchy) established by ITU-T, each row of a frame structure that consists of multiple rows and multiple columns uses a fixed frame length (number of columns) according to the transmission speed. The ratio of the size of the payload to the frame length is larger compared to the case of the HTMC frame. In addition, a header section including a synchronization pattern for synchronization of frames is provided at the beginning of the frame structure, and frame synchronization is performed by detecting the synchronization pattern in the header section.

Meanwhile, the larger the size of the payload, the more likely it is that the data of the payload includes the same pattern as the synchronization pattern in the header section, and that the header section is falsely detected. When the header section is falsely detected, frame synchronization fails and monitor data cannot be received. Therefore, by scrambling data of the payload so that the data of the payload does not include the synchronization pattern, the false detection of the header section is avoided.

However, when scrambling the payload data, it is necessary to perform scramble processing on the transmitting side and descramble processing on the receiving side. A processor such as a MCU (Micro Control Unit) mounted on an optical transceiver is smaller than a processor mounted on a server or the like, for example. Thus, it is difficult to implement hardware that performs scramble and descramble processing on a MCU mounted in an optical transceiver. Also, other processes may not be executed at a desired timing when a MCU mounted in an optical transceiver executes a scramble processing program and a descramble processing program.

According to one aspect of the present embodiment, an optical transceiver for receiving an optical signal on which a monitor signal is superimposed, the optical transceiver including: an extractor configured to extract the monitor signal from the optical signal received; and a reception processor configured to reproduce monitor data from the monitor signal extracted by the extractor wherein the monitor signal includes a frame including, in this order, a header section comprised of specific fixed data, an identification section comprised of identification data updated based on a predetermined rule for each transmission of the monitor signal, and a payload section including the monitor data, the reception processor includes a memory for storing update data having a same byte length as the identification data, the reception processor generates a bit string from the monitor signal extracted by the extractor, and searches for the fixed data in a byte string generated from the bit string, the reception processor extracts, in a case where first data that match the fixed data are detected, second data following the first data and having a same byte length as the identification data from the byte string, and the reception processor extracts, in a case where the second data and a value obtained by changing the update data based on the predetermined rule match, the monitor data from the byte string by determining that data following the second data are the payload section, and updates the update data with the second data and stores the updated update data in the memory is provided.

BRIEF DESCRIPTION OF THE DRAWINGS

FIG. 2 is a diagram illustrating an example of a frame format of a frame including monitor data transmitted between the optical transceivers of FIG. 1;

DESCRIPTION OF THE EMBODIMENTS

[Details of Embodiment of Present Disclosure]

An embodiment of an optical transceiver of the present disclosure will be described with reference to the drawings. The present embodiment is not limited to the following description. In the following description, for the signal line through which information such as a signal is transmitted, the same code as the name of the signal is used. Unless otherwise indicated, the arrowed lines in the block diagram indicate signal lines or transmission paths of information. The signal lines illustrated with a single line in the figure may be multi-bit signal lines.

One Embodiment

[Overall Configuration of Optical Transceiver]

Figure 1:
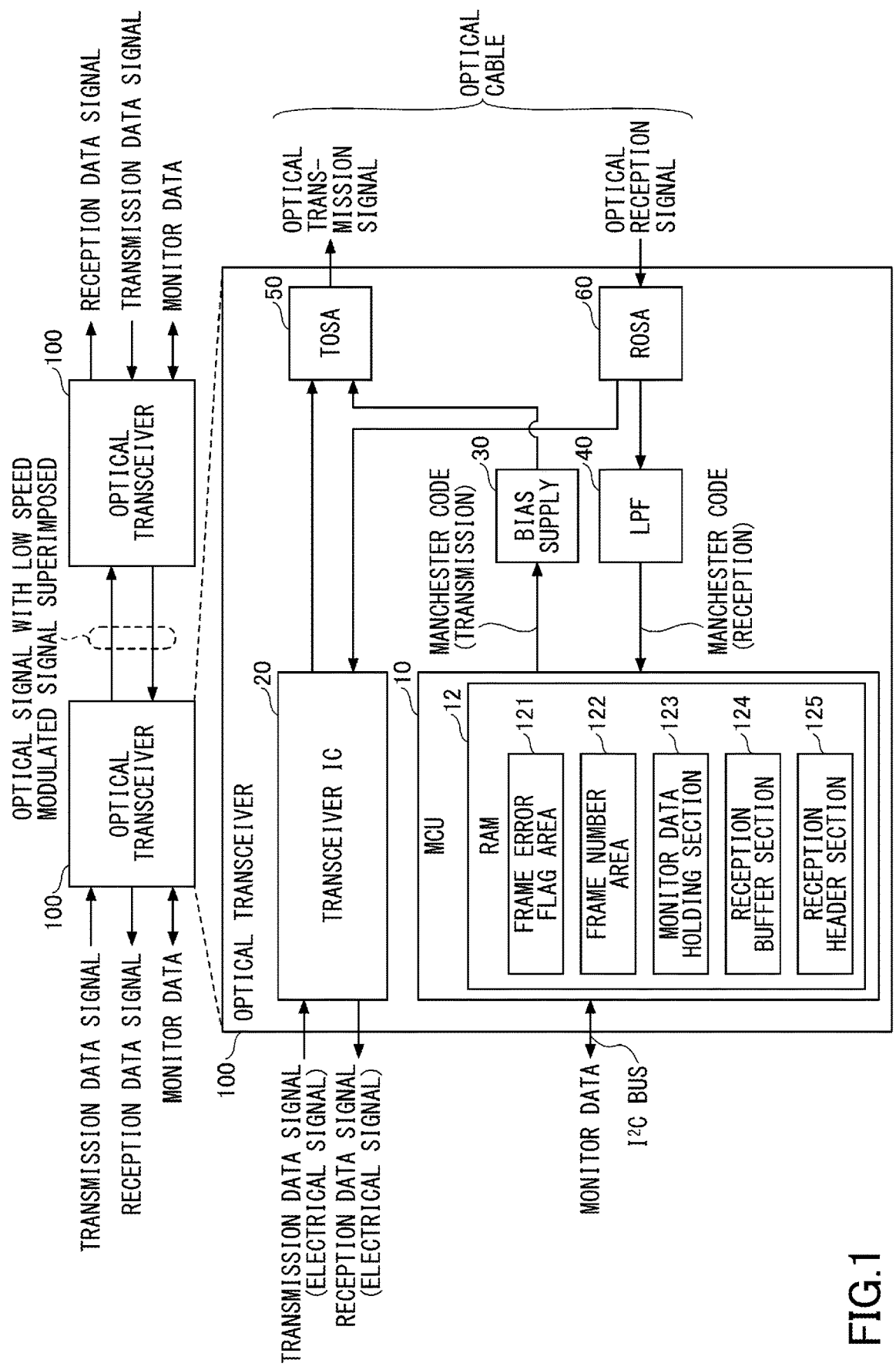
FIG. 1 is a block diagram illustrating a configuration example of an optical transceiver according to an embodiment.

FIG. 1 is a block diagram illustrating a configuration example of an optical transceiver according to an embodiment. For example, in FIG. 1, two optical transceivers 100 connected to each other via a two-core optical cable (an optical fiber) transmit and receive an optical signal with a low speed modulated signal superimposed. The optical transceivers 100 can transmit monitor data and receive monitor data via the low speed modulated signal. The optical transceivers 100 have the same configuration as each other. The optical transceiver 100 on the left side of FIG. 1 is described below.

The optical transceiver 100 includes a MCU (Micro Control Unit) 10, a transceiver IC 20, a bias supply 30, a low-pass filter (LPF) 40, a TOSA (Transmitter Optical Sub-Assembly) 50, and a ROSA (Receiver Optical Sub-Assembly) 60. For example, the optical transceiver 100 is removably mounted to an optical transmission device (not illustrated) that transmits and receives digital signals. For example, the bias supply 30 and the TOSA 50 are examples of optical transmitters. The ROSA 60 and the low pass filter 40 are examples of an optical receiver (extractor).

When an optical signal is transmitted via the optical cable, the side of the optical cable that transmits the optical signal is referred to as a transmitting end, and the side that receives the optical signal transmitted from the transmitting end is referred to as a receiving end. The optical transceiver 100 at the transmitting end converts a transmission data signal (a digital electrical signal) received from the optical transmission device at the transmitting end into an optical signal. Then, the optical transceiver 100 at the transmitting end transmits the converted optical signal to the optical transceiver 100 mounted to the optical transmission device at the receiving end via the optical cable. The optical transceiver 100 at the receiving end converts the optical signal received from the optical transceiver 100 at the transmitting end via the optical cable into a reception data signal (a digital electrical signal). Then, the optical transceiver 100 at the receiving end outputs the converted reception data signal to the optical transmission device at the receiving end. The transmitting end and the receiving end are convenient distinctions for the purpose of explanation. The optical signal is transmitted and received in both directions. The optical transceiver 100 at the transmitting end with regard to transmitting, is of the receiving end with regard to receiving.

The optical transceiver 100 at the transmitting end superimposes a low speed modulated signal containing monitor data on an optical signal, and transmits the signal to the optical transceiver 100 at the receiving end connected via the optical cable. For example, the optical transceiver 100 at the transmitting end transmits Manchester-encoded monitor data and receives Manchester-encoded monitor data to/from the opposing optical transceiver 100 at the receiving end. The low speed modulated signal containing monitor data is an example of a signal for monitoring. Examples of the monitor data include, but are not limited to, a monitor value (at least one of temperature of an internal mounting component, power supply voltage, laser bias current, optical transmission power, optical reception power, and the like) collected by the optical transceiver 100 at the transmitting end. The monitor data may also include unique information that can identify the optical transceiver 100 at the transmitting end, instruction to change the wavelength of an optical signal, instruction to change the optical output power, and the like. The unique information that can identify the optical transceiver 100 includes, for example, a product name (model number) and manufacturing number of the optical transceiver 100.

The MCU 10 has various communication interfaces such as an $I^2C$ (Inter-Integrated Circuit) interface (not illustrated), peripheral functions such as a DMAC (Direct Memory Access Controller), and RAM (Random Access Memory) 12. The MCU 10 has a ROM (read only memory) in which various programs executed by the MCU 10 are stored. The ROM (built-in ROM) may be, for example, a flash memory. The MCU 10 controls operation of the optical transceiver 100 and also functions to process the monitor data. The MCU 10 may be, for example, a microcomputer, or a logic device such as a CPLD (Complex Programmable Logic Device) or a FPGA (Field Programmable Gate Array). A function unit that executes a receiving operation of the monitor data in the MCU 10 is an example of a reception processor.

A RAM 12 includes a frame error flag area 121 storing a frame error flag, a frame number area 122 storing a frame number (1 byte update data), and a payload area (monitor data holding section) 123 storing payload data (monitor data). The RAM 12 is an example of memory. The frame error flag is an example of a reception flag indicating whether the frame synchronization succeeded. The frame error flag area 121 is an example of a reception flag holding section. The frame number area 122 is an example of a frame number holding section. The monitor data holding section 123 is an example of a monitor data holding section.

Figure 3:
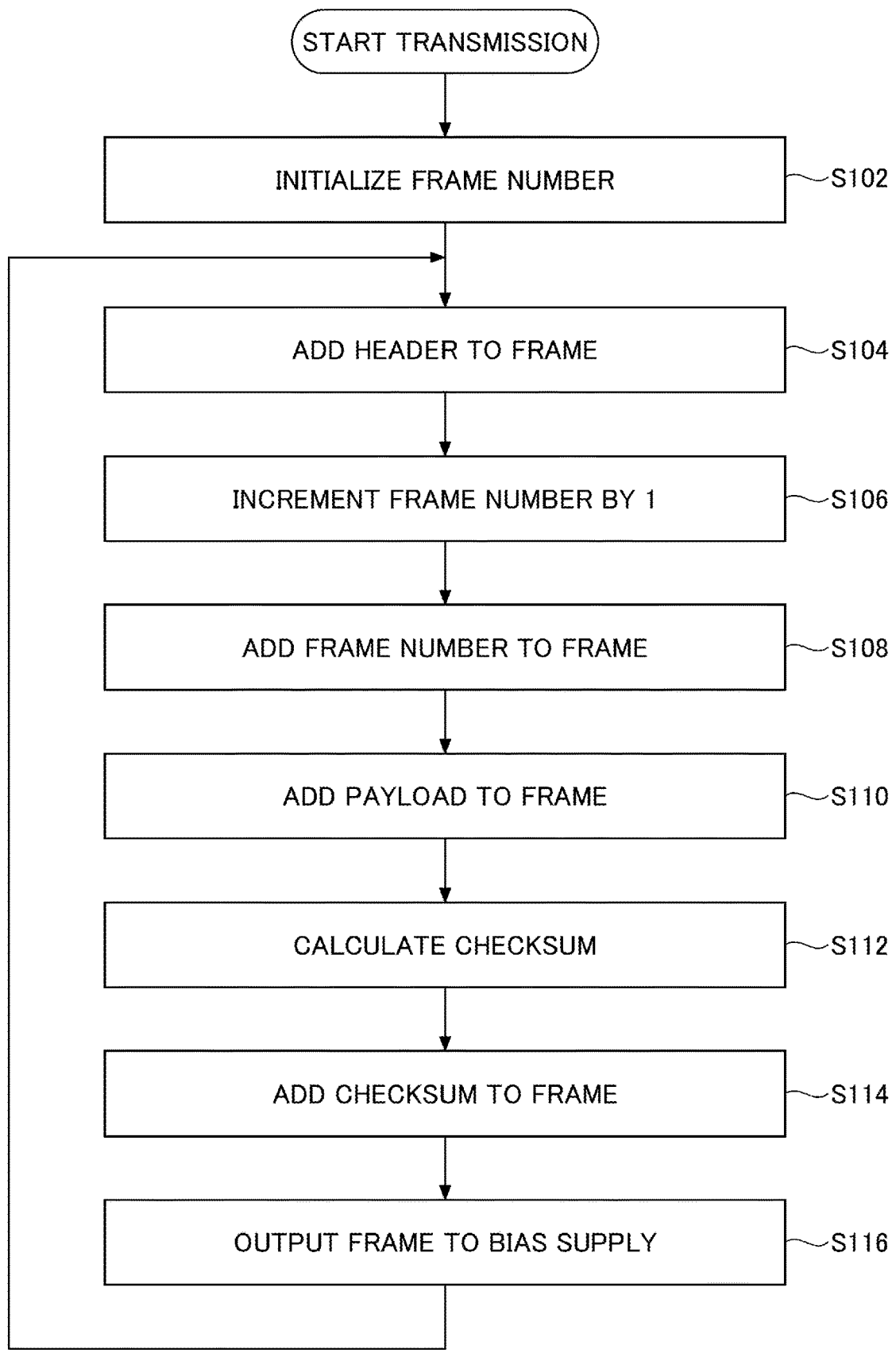
FIG. 3 is a flow diagram illustrating an example of transmitting operation of a frame including monitor data by the optical transceiver of FIG. 1.
Figure 4:
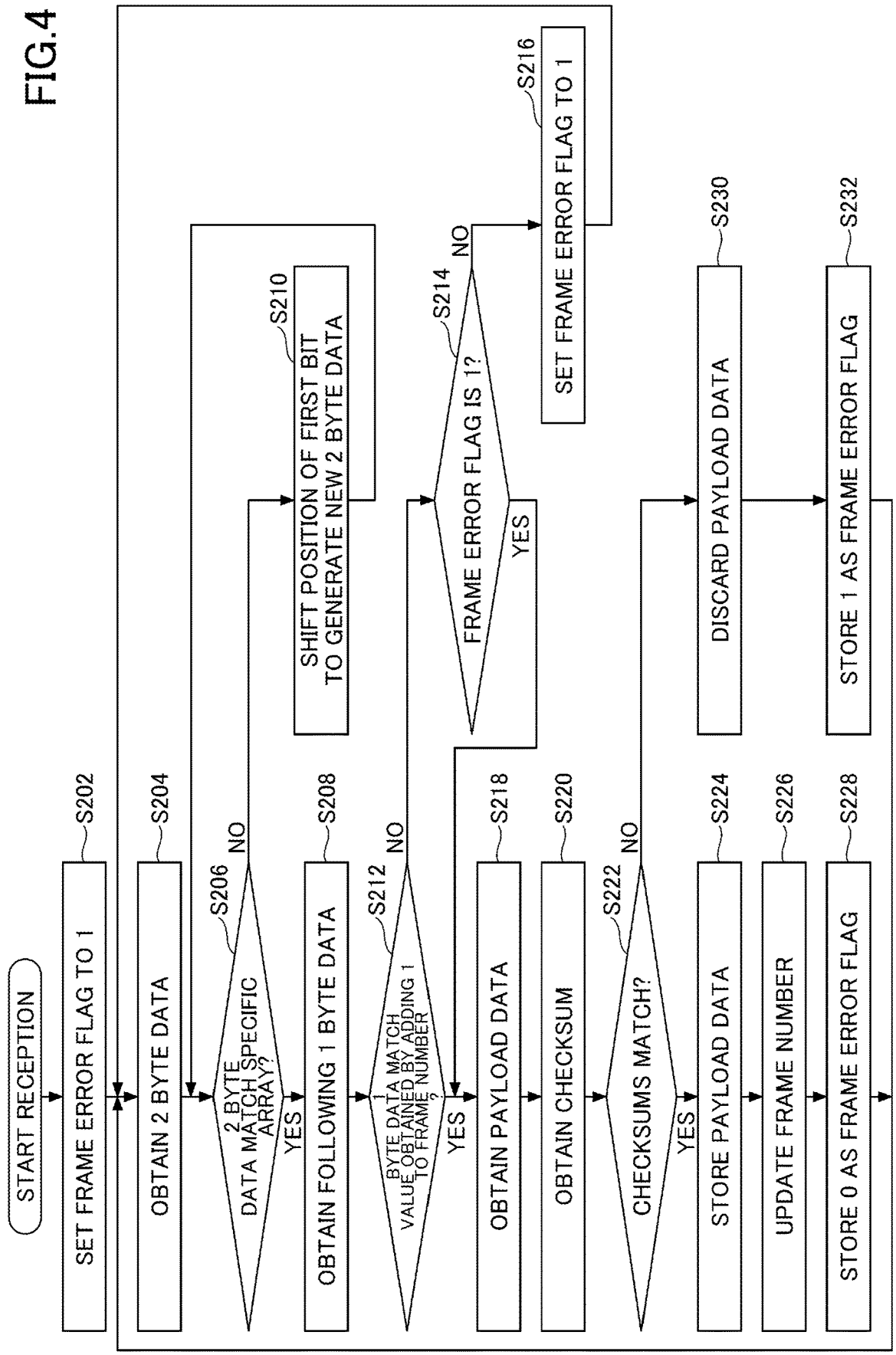
FIG. 4 is a flow diagram illustrating an example of receiving operation of a frame including monitor data by the optical transceiver of FIG. 1.
Figure 5:
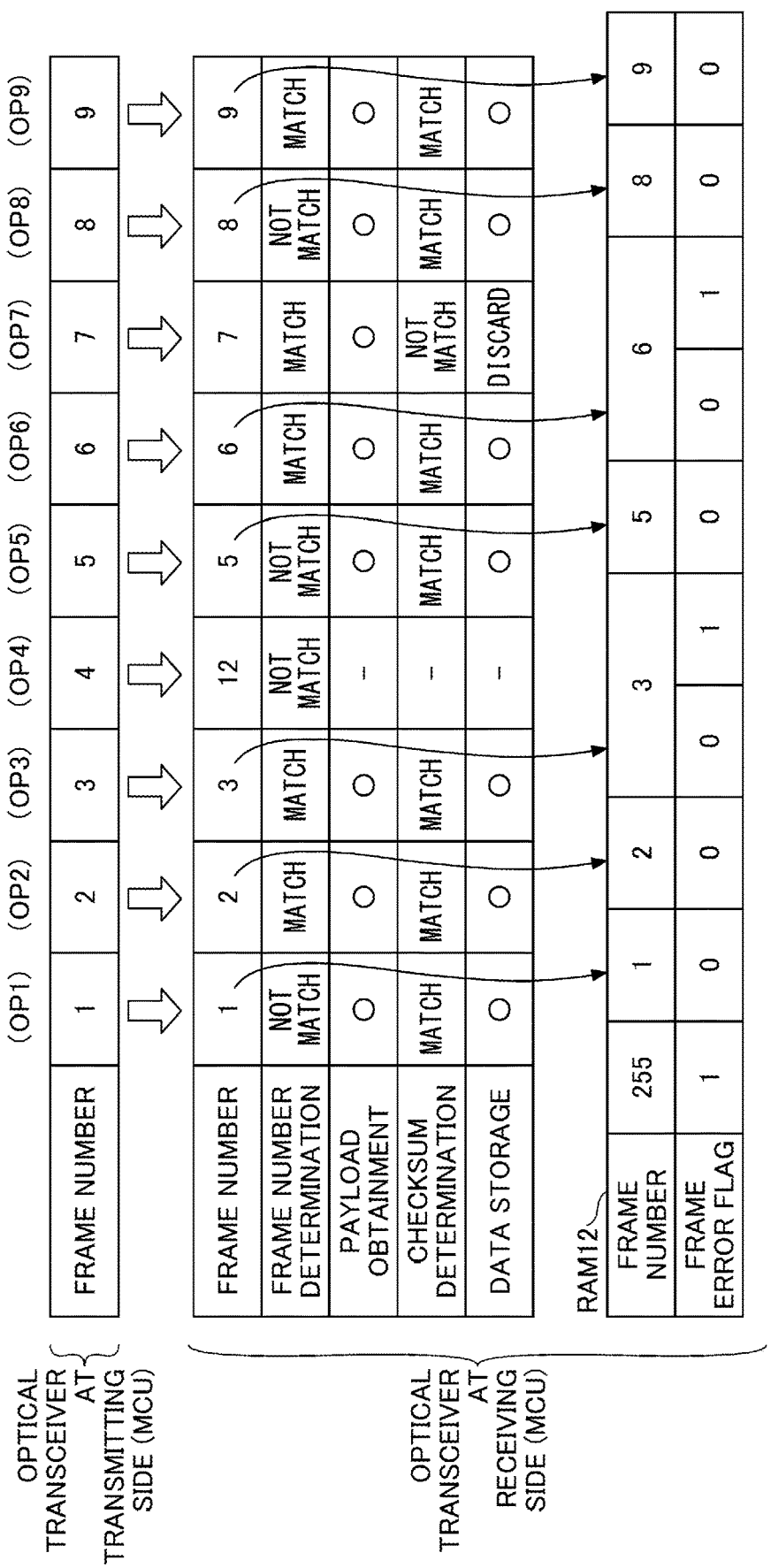
FIG. 5 is a diagram illustrating an example of transmitting and receiving operation of a frame including monitor data between the optical transceivers of FIG. 1.

The frame error flag area 121 and the frame number area 122 are used for a receiving operation of monitor data transmitted from the optical transceiver 100 at the transmitting end connected via the optical cable. Examples of the receiving operation of monitor data are illustrated in FIGS. 4 and 5. An example of transmitting operation of monitor data is illustrated in FIG. 3.

The MCU 10, for example, receives monitor data from the optical transmission device via the $I^2C$ bus, and generates a frame including the received monitor data. The monitor data is stored, for example, in a payload section PL (described later) of the frame. The MCU 10 converts (encodes) the bit string corresponding to the generated frame (the byte string having a length of the frame size) into a Manchester code, and outputs the converted Manchester code to the bias supply 30. For example, when the frame size is 6 bytes, the length of the bit string is 48 bits. That is, the bit string is data in which 48 binary numbers "0" or "1" are arranged in succession. The TOSA 50 generates a low speed modulated signal containing the monitor data by means of a bias current in which amplitude is modulated based on the Manchester code output from the bias supply 30. The details of operation of the TOSA are described later.

The MCU 10 receives a low speed received signal via the ROSA 60 and the low pass filter 40. The low speed received signal is superimposed on the optical signal transmitted from the optical transceiver 100 at the opposite transmitting end via the optical cable. The low pass filter 40 extracts the low speed modulated signal from the optical signal received from the optical transceiver 100 at the transmitting end, and outputs the low speed modulated signal to the MCU 10 as a Manchester-encoded low speed received signal. The extractor extracting the low speed modulated signal from the optical signal is an example of the optical receiver. The extractor includes, for example, the ROSA and the low pass filter 40. The MCU 10 converts (decodes) the received Manchester-encoded low speed received signal into a bit string. The converted bit string is processed by the MCU 10, and, by detecting a frame from the bit string, the monitor data stored in the payload section PL is generated (reproduced). That is, the MCU 10 detects a frame from the bit string, performs frame synchronization, and extracts the monitor data from the byte string generated from the bit string based on a frame format. The MCU 10 outputs the extracted monitor data to the optical transmission device via, for example, the I²C bus. The MCU 10 has an encoder and a decoder for a Manchester code, for example. The code used for the low speed modulated signal transmitted and received between the optical transceivers 100 is not limited to Manchester code, but may be other codes. In this manner, the function unit reproduces monitor data from a Manchester-encoded low speed received signal by frame synchronization. The function unit is an example of a reception processor.

The transceiver IC 20 generates, for example, a digital signal of an NRZ (Non Return to Zero) signal based on a transmission data signal received from the optical transmission device, and outputs the generated digital signal to the TOSA 50. The transceiver IC 20 may be, for example, a CDR (Clock Data Recovery)-IC. For example, the CDR-IC may output the waveform signal of the transmission data signal as the digital signal to the TOSA 50. The transceiver IC may be a digital signal processing IC. For example, the digital signal processing IC may output the signal obtained by processing the transmission data signal into a digital signal to the TOSA 50 as the digital signal. In addition, the transceiver IC 20 receives a digital signal such as an NRZ signal from the ROSA 60. The digital signal is converted from the optical signal received from the optical transceiver 100 at the transmitting end connected via the optical cable. The transceiver IC 20 converts the received digital signal into a reception data signal and outputs the converted reception data signal to the optical transmission device. For example, the CDR-IC may output the waveform signal of the received digital signal as the reception data signal. The transceiver IC may be a digital signal processing IC. For example, the digital signal processing IC may output the signal obtained by digitally processing the received digital signal as the reception data signal.

The bias supply 30, for example, amplitude-modulates a drive current driving a laser diode (not illustrated) mounted on the TOSA 50 according to the Manchester code, and supplies the amplitude-modulated bias current to the TOSA 50. For example, the bias supply 30 decreases a bias current when the Manchester code is "0", and increases a bias current when the Manchester code is "1". For example, the ratio (amplitude modulation rate) of "the magnitude of increase or decrease of a bias current based on a Manchester code" to "the magnitude of a bias current without amplitude modulation" is approximately a few percentage points. The TOSA 50 superimposes a low speed modulated signal including the Manchester-encoded monitor data on the optical signal, by converting the electrical signal to an optical signal by means of a bias current in which amplitude is modulated by the bias supply 30. The signal velocity of the low speed modulated signal is, for example, 50 Kbit/s, although not particularly limited. The speed of the high speed optical signal is, for example, 10 Gbit/s or more.

The laser diode of the TOSA 50 converts an electrical signal, such as an NRZ signal, received from the transceiver IC 20 into an optical signal. The TOSA outputs the optical signal converted from the electrical signal as an optical transmission signal to the optical transceiver 100 at the receiving end via the optical cable. For example, when the electrical signal is an NRZ signal, in a case where the NRZ signal is "0" (0 state), the TOSA 50 decreases the signal intensity (optical power) of the optical signal output by the laser diode, and in a case where the NRZ signal is "1" (1 state), the TOSA 50 increases the signal intensity (optical power) of the optical signal output by the laser diode. At this time, by using the bias current of the laser diode that is amplitude-modulated based on the Manchester code described above, the low speed modulated signal is superimposed on the high speed optical signal. The amplitude of the low speed modulated signal is approximately a few percentage points of the amplitude of the fast optical signal. The laser diode outputs the optical signal, on which the low speed modulated signal is superimposed, to the optical transceiver 100 at the receiving end via the optical cable. The TOSA 50 may include a laser diode for outputting continuous light (CW light) and an optical modulator in which the continuous light is input, and an optical signal may be generated from the continuous light by driving the optical modulator with the electrical signal. The bias supply 30 and the TOSA 50 are examples of an optical transmitter. The optical transmitter superimposes a low speed modulated signal containing the monitor data that is Manchester-encoded by the MCU 10 on the optical transmission signal, and transmits the signal.

The ROSA 60 receives the optical signal, on which the low speed modulated signal is superimposed, from the optical transceiver 100 at the transmitting end connected via the optical cable, as an optical reception signal. The ROSA 60 converts the optical reception signal into a current signal, amplifies the converted current signal, converts the converted current signal into a voltage signal, and outputs the converted voltage signal to the transceiver IC 20 and the low pass filter 40.

The low pass filter 40 cuts off the high-frequency component of the voltage signal received from the ROSA 60, and extracts the low speed received signal superimposed on the optical reception signal. The extracted low speed received signal is a Manchester-encoded signal of data (bit string) of a frame including monitor data. The low pass filter 40 outputs the extracted low speed received signal to the MCU 10. The MCU 10 decodes the Manchester-encoded low speed received signal to generate a bit string. The MCU 10 may include a digital filter and extract the low speed received signal using a digital filter instead of the low pass filter 40.

[Frame Format of Frame Including Monitor Data]

FIG. 2 is a diagram illustrating an example of a frame format (frame structure) of a frame FRM including monitor data transmitted between the optical transceivers of FIG. 1.

The frame length (frame size) of the frame FRM for the transmission of monitor data is, for example, a fixed length of 256 bytes. The frame FRM for transmitting monitor data includes, in order from the beginning, a header section HD, a frame number section FN, a payload section PL, and a checksum section CS. The header section HD is fixed data (for example, 2 byte data having a fixed value) for detecting the start of the frame FRM. The fixed data are also referred to as a synchronization pattern. The frame number section includes, for example, 1 byte data representing the frame number. The payload section PL includes monitor data. The length of the payload section PL is, for example, 251 bytes. The checksum section CS includes data for error detection of the monitor data. The length of the checksum section CS is, for example, 2 bytes.

With the frame format illustrated in FIG. 2, the MCU 10 can transmit a header, a frame number, monitor data, and the like to the optical transceiver 100 at the receiving end by using a transmission method using a frame. Also, the MCU 10 can receive a header, a frame number, monitor data, and the like transmitted from the optical transceiver 100 at the transmitting end by using a transmission method using a frame.

The ratio of the payload section to the frame size illustrated in FIG. 2 is 98%. The Manchester-encoded frame FRM is transmitted between the optical transceivers 100 by the low speed modulated signal using the frame format of FIG. 2. The frame number is an example of identification data that is updated each time of transmission according to a predetermined rule. The frame number section is an example of an identification section in which the frame number is positioned.

More specifically, fixed data for identifying the beginning of a frame format is positioned in the header section HD. The value positioned in the header section HD is previously determined between the optical transceivers 100 that transmit and receive monitor data to/from each other. For example, the value F6h (where "h" indicates that the numerical number before "h" is a hexadecimal number) and 28h, that are used in the section overhead (SOH) of the SONET/SDH frame, are arranged in the header section HD as specific fixed data. In this case, the bit string of the header section HD is 1111011000101000b (where "b" indicates that the numerical number before "b" is a binary number). The value positioned in the header section HD is not limited to F628h, provided that the value is a value determined between the optical transceivers 100 that transmit and receive monitor data. The fixed data positioned in the header section HD is also referred to as a synchronization pattern.

The frame number section FN stores a frame number to be updated each time the frame FRM is transmitted. For example, the frame number is updated (for example, incremented) by "1" each time the frame FRM is transmitted. The frame number is not limited to the value that is updated sequentially, as long as the value is updated in accordance with the rule determined between the optical transceivers 100 that transmit and receive monitor data.

For example, the frame number may be a pseudo random number obtained by using a predetermined function, such as a recurrence formula of a linear congruential generator $(X_{n+1}=(A*X_n+B) \bmod M; n, A, B, M$ is an integer). By using a predetermined function, the frame number, that is, the number of bits updated in the bit string of the identification data, can be limited. Thus, by reducing a false detection, the detection accuracy of a frame number can be further improved.

The increment of "1" described above corresponds to the case of A="1", B="1", and M="256" in the recurrence formula described above. The frame number may be decremented by "1", by setting A="1", B="–1", and M="256" in the recurrence formula described above. The period of the frame number to be updated is preferably 256, which can be represented in 8 bits of the frame number section, but may be other than 256.

Gray code may be used for the frame number. Only one bit of the frame number is updated by Gray code. Rules for updating the frame number need only be recognized by each other between the optical transceivers 100 that transmit and receive monitor data. The updated frame number may be discontinuous.

The monitor data stored in the payload section PL includes, for example, a monitor value of the optical transceiver 100 (for example, temperature of the mounting component, power supply voltage, laser bias current, optical transmission power, optical reception power, and the like). That is, for each frame, monitor data for monitoring and controlling the optical transceiver 100 are mutually transmitted between the optical transceivers 100.

In the checksum section CS, for example, a checksum (checksum data) obtained as follows is stored. A total of 252 bytes of 1 byte of the frame number and 251 bytes of the monitor data in the payload section PL is divided into 126 pieces of data, 2 bytes each from the beginning, and the lower 2 bytes of the sum of the 126 data are stored as a checksum (checksum data). Note that the checksum is not limited to a simple sum. For example, a checksum obtained as follows may be set. A total of 252 bytes of 1 byte of the frame number and 251 bytes of the monitor data in the payload section PL is divided into 126 pieces of data, 2 bytes each from the beginning, and the exclusive logical sum of the 126 data minus 1 is set as a checksum. The number of bytes of the checksum is preferably 2 bytes to improve accuracy, but may be 1 byte. When a checksum is 1 byte, the number of bytes of the header section or the frame number section may be increased by 1 byte. A checksum may be generated only from the data of the payload section PL. In that case, the checksum may be generated using a predetermined fixed value of 1 byte instead of the 1 byte of the frame number.

In the frame number section FN, the frame number is stored, which is updated each time the frame FRM is transmitted. Because the frame number section FN together with the header section HD is provided in the frame FRM, the accuracy of the detection of the frame FRM can be improved compared to the case in which the frame FRM is detected only by the match of the header section HD. In addition, the possibility that the bit string of a combination of the header and the frame number is included in the bit string of the monitor data of the payload section PL is lower than the possibility that the bit string of only the header is included in the bit string of the monitor data. Therefore, it is possible to reduce the possibility that the bit string in the monitor data is falsely detected as the header and the frame number. As a result, the monitor data superimposed on an optical signal without scrambling can be received while reducing the possibility of false detection.

[Transmitting Operation of Frame Including Monitor Data]

FIG. 3 is a flow diagram illustrating an example of a transmitting operation of the frame FRM including monitor data by the optical transceiver 100 of FIG. 1. For example, the operation illustrated in FIG. 3 is implemented by the MCU 10 executing the control program stored in the internal ROM. That is, FIG. 3 illustrates an example of a method for controlling the optical transceiver 100 and an example of a program for controlling the optical transceiver 100. The operation illustrated in FIG. 3 may be implemented by a logic circuit programmed in a programmable logic unit provided in the MCU 10. Alternatively, the operation illustrated in FIG. 3 may be performed by a logic device such as a CPLD or a FPGA in place of the MCU.

As described above, the monitor data includes, for example, a monitor value (at least one of temperature of an internal mounting component, power supply voltage, laser bias current, optical transmission power, optical reception power, and the like) collected by the optical transceiver 100 at the transmitting end. The monitor value reflects a change occurred in at least one of an operating environment or an operating condition of the optical transceiver. The monitor value has an almost stable value (for example, a monitor value of temperature is updated to 49.9° C., 50.1° C., 50.0° C., 50.2° C., 49.9° C., and the like), although there is a variation within acceptable range, unless at least one of the operating environment or the operating condition of the optical transceiver at the transmitting end change significantly. It is supposed that even when the value changes temporarily due to a noise and the like, it returns to the stable value again. When a steady change occurs in at least one of the operating environment or the operating condition of the optical transceiver at the transmitting end beyond the acceptable range of the variation, a monitor value that reflects the change is obtained continuously (for example, when the temperature rises by 5° C. in the example above, values of 54.9° C., 55.0° C., 55.1° C., 54.8° C., 54.9° C., and the like are obtained). Thus, when the optical transceiver 100 at the transmitting end is operating in a steady state with no particularly significant change, the monitor data are data with high redundancy.

The operation illustrated in FIG. 3 is started, for example, when the optical transceiver 100 is powered on and the transmitting operation of the optical signal is started. Alternatively, the operation is started when the optical transceiver 100 is reset by the optical transmission device, and the transmitting operation of the optical signal is started. More specifically, the operation illustrated in FIG. 3 is started when the optical transceiver 100 at the transmitting end transmits monitor data to the optical transceiver 100 at the receiving end. First, in step S102, the MCU 10 initializes the frame number stored in the frame FRM for transmitting the monitor data to, for example, "0". Next, in step S104, the MCU 10 adds a header section HD (for example, F628h) to the frame FRM. At this time, the header section HD is positioned at the beginning of the frame FRM. More specifically, the MCU 10 stores the value of the header (for example, F628h) in the area of the header section HD allocated to the transmission buffer section 127 (not illustrated) of the RAM 16. As described above, because the header section HD is data having a fixed value, the header section HD may be positioned at the beginning of the frame FRM in advance.

Next, in step S106, the MCU 10 increments the frame number by "1". More specifically, the MCU 10 increments the value of the frame number stored in the area of the frame number section FN allocated to the transmission buffer section 127 by "1". In the RAM 16, the value of the frame number is processed as a hexadecimal number. When the length of the frame number is 1 byte, the MCU 10 initializes the value of the frame number to, for example, "00h" before the first transmission of the frame FRM. Next, in step S108, the MCU 10 adds the frame number incremented in step S106 to the frame FRM. At this time, the frame number is stored in the frame number section FN. More specifically, the MCU 10 stores the frame number of the frame FRM to be transmitted in the area of the frame number section FN allocated to the transmission buffer section 127. Next, in step S110, the MCU 10 adds a message (monitor data) to the frame FRM. At this time, the monitor data is stored in the payload section PL without the scramble processing. More specifically, the MCU 10 stores a message (monitor data) in the area of the payload section PL allocated to the transmission buffer section 127. In the following description, the data having a length of the payload section PL stored in the payload section PL is referred to as a message. For example, 251 bytes of the monitor data is an example of a message.

Next, in step S112, the MCU 10 calculates a checksum of the frame number and the monitor data added to the frame FRM. Next, in step S114, the MCU 10 adds the checksum calculated in step S112 to the frame FRM. At this time, the checksum is stored in the checksum section CS. More specifically, the MCU 10 stores the calculated checksum in the area of the checksum section CS allocated to the transmission buffer section 127. Next, in step S116, the MCU 10 performs Manchester encoding of the frame FRM generated in step S104 to step S114, and outputs the encoded frame FRM to the bias supply 30. More specifically, the MCU 10 generates a bit string from the data included in the frame FRM generated in the transmission buffer section 127, encodes the bit string into the Manchester code, and outputs the encoded bit string to the bias supply 30.

The frame FRM that includes the monitor data positioned in the payload section PL, and is output to the bias supply 30, is superimposed on an optical signal as a low speed modulated signal at the TOSA 50, and transmitted as an optical signal to the other optical transceiver 100 connected via the optical cable. More specifically, the bias supply 30 supplies the amplitude-modulated bias current to the TOSA 50 according to the Manchester code. The TOSA 50 converts a transmission signal, such as an NRZ signal, received from the transceiver IC 20 into an optical transmission signal using the bias current that is amplitude-modulated according to the Manchester code. In this manner, the low speed modulated signal containing the monitor data converted to the Manchester code is superimposed on the optical transmission signal. The TOSA 50 outputs the optical transmission signal on which the low speed modulated signal is superimposed to the optical cable connected to the optical transceiver 100 of the receiving side. Thus, one transmitting operation of the frame FRM is completed. When the plurality of frames FRM is transmitted consecutively, the MCU 10 repeats the operation of step S104 to step S116.

[Receiving Operation of Frame Including Monitor Data]

FIG. 4 is a flow diagram illustrating an example of a receiving operation of a frame FRM including the monitor data by the optical transceiver 100 of FIG. 1. Similar to FIG. 3, for example, the operation illustrated in FIG. 4 is implemented by the MCU 10 executing the control program stored in the internal ROM. That is, FIG. 4 illustrates an example of a method for controlling the optical transceiver 100 and an example of a program for controlling the optical transceiver 100. The operation illustrated in FIG. 4 may be implemented by a logic circuit programmed in a programmable logic unit provided in the MCU 10.

Alternatively, the operation illustrated in FIG. 4 may be performed by a logic device such as a CPLD or a FPGA in place of the MCU.

The operation illustrated in FIG. 4 is started when the optical transceiver 100 is powered on and the receiving operation of the optical signal is started. For example, when the optical transceiver 100 is a pluggable optical transceiver, the optical transceiver 100 is mounted in a cage of an optical transmission device, power is supplied to the optical transceiver 100 from the optical transmission device, and the optical transceiver 100 is powered on. Alternatively, the operation is started when the optical transceiver 100 is reset by the optical transmission device, and the receiving operation of the optical signal is started. More specifically, the operation illustrated in FIG. 4 is started when the optical transceiver 100 at the receiving end receives monitor data from the optical transceiver 100 at the transmitting end. The bit string received from the optical transceiver 100 at the transmitting end is, for example, sequentially held in a reception buffer section 124 allocated to the RAM 16, before performing frame synchronization. First, in step S202, the MCU 10 sets the frame error flag held in the frame error flag area (frame error flag holding section) 121 to "1" as an initial value. Next, in step S204, the MCU 10 decodes the Manchester code extracted by the low pass filter 40 to generate a bit string. The MCU 10 converts the generated bit string per 8 bits by every 8 bits from the first bit into 1 byte data, and sequentially stores the generated 1 byte data in the reception buffer section 124 in the order the 1 byte data was generated. Accordingly, a byte string is generated in the reception buffer section. The MCU 10 transmits 2 bytes in the order of reception, among the byte string held in the reception buffer section 124, that are not yet obtained by the reception header section 125, to the reception header section 125. That is, the MCU 10 obtains a byte string (2 bytes) having the same length as the header section HD from the byte string held in the reception buffer section 124.

Next, in step S206, the MCU 10 determines whether or not the 2 byte data (the first data) obtained in step S204 match a specific array for identifying the header section HD (for example, fixed data F628h). This corresponds, for example, to determining a match with the synchronization pattern of the header (for example, 1111011000101000b described above) in the bit string. When the 2 byte data (the first data) match the fixed data, the MCU 10 detects the 2 byte data (the first data) as the header section HD. In step S208, the MCU 10 obtains 1 byte in the order of reception, among the data held in the reception buffer section 124, that is not yet obtained by the reception header section 125 and the frame number holding section 122, as the frame number section FN of the frame FRM. Then, it proceeds to the processing of step S212. That is, the MCU 10 obtains 1 byte data following the first data. The 1 byte data obtained in step S208 may be referred to as the second data.

When the 2 bytes of data (the first data) are not matched with the fixed data of the header section HD, in step S210, the MCU 10 shifts the position of the first bit of the 2 bytes of data previously transmitted to the reception header section 125 by 1 bit to the next, among the data held in the reception buffer section 124, to generate new 2 bytes of data. The MCU 10 transfers the newly generated 2 bytes of data to the reception header section 125. Then, it returns to the processing of step S206. When the position of the first bit is shifted by 1 bit to the next, for the last bit of the new 2 bytes of data, the first bit in the next 1 byte after the 2 bytes of data previously transmitted is used. Alternatively, the new 2 bytes of data are generated by adding the next 1 byte to the 2 bytes of data previously transmitted, shifting each bit 1 bit ahead, and then converting each 8 bits from the first bit into 1 byte. That is, the MCU 10 shifts the data of the reception header section 125 by 1 bit, purges the oldest 1 bit from the reception header section 125, and adds the last 1 bit from the byte that is not yet obtained by the reception buffer section 124 in the order of reception. In step S206, the MCU 10 determines whether the new 2 byte data match the fixed data of the header section HD. That is, the MCU 10 performs the process of shifting the position of the first bit in the bit string to the next to generate a new byte string, until the fixed data of the header is detected in the byte string generated from the bit string including the monitor data. Accordingly, the MCU 10 can reliably detect the fixed data representing the header section HD and perform frame synchronization with the frame FRM transmitted as a low speed modulated signal. In this manner, the receiving operation of the monitor data can be performed based on the detection of the fixed data of the header section.

The data held in the reception buffer section 124 are supposed that the value that is obtained by converting the bit string so that each 8 bits from the first bit into 1 byte data, is retained from step S208 when the value (synchronization pattern) of the header section HD matches the data in the reception header section 125. When the frame data is correctly received in frame synchronization with the frame FRM, it is expected that the 1 byte data (the second data) obtained in step S208 is the value obtained by adding "1" to the frame number (update data) held in the frame number holding section 122. Accordingly, in step S212, the MCU 10 determines whether the 1 byte data (the second data) obtained in step S208 match the value obtained by adding "1" to the frame number (the updated data) held in the frame number holding section 122, that is, an expected value. In other words, the second data and the update data are determined to satisfy the relationship based on the rules for updating the identification data. When the second data match the expected value, the MCU 10 performs step S218, and when the second data do not match the expected value, the MCU 10 performs step S214.

In step S214, the MCU 10 determines whether the frame error flag held in the frame error flag holding section 121 is "1". The frame error flag "1" indicates that the last receiving operation of the monitor data failed because frame synchronization could not be performed, or that the last receiving operation is not performed (that is, the first receiving operation). The frame error flag "0" indicates that the last receiving operation of the monitor data succeeded by frame synchronization. It is noted that another definition of the value of the frame error flag may be applied as long as the value enables the MCU 10 to determine whether the frame synchronization failed or succeeded. For example, the frame error flag "1" may indicates the success of the frame synchronization and the frame error flag "0" may indicates the failure, and the MCU 10 may perform the processes described below with exchanging the frame error flag "1" and the frame error flag "0" each other about the conditions of the processes.

When the frame error flag is "1", the MCU 10 performs step S218, and when the frame error flag is not "1", the MCU 10 performs step S216. In step S216, the MCU 10 determines that the receiving operation of the frame FRM failed because the 1 byte data (the second data) obtained in step S208 do not match the expected value in step S212, and sets the frame error flag holding section 121 to "1". In order to obtain the next 2 bytes, the MCU 10 performs step S204. As described above, when the MCU 10 does not detect the frame number that follows the frame number of the last reception, the MCU 10 determines that frame synchronization could not be performed, and can start the next receiving operation promptly. Therefore, the detection frequency of monitor data can be increased.

In step S218, the MCU 10 obtains, as the payload section PL of the frame FRM, the next 251 bytes after the 1 byte obtained as the frame number section FN, among the data held in the reception buffer section 124. The 251 bytes of data is an example of extraction data having the same byte length as the payload section PL. Next, in step S220, the MCU 10 obtains, as a checksum, the next 2 bytes after the 251 bytes obtained as the payload section PL, among the received byte string. The next 2 bytes of data after the payload section PL is an example of checksum data having the same byte length as the checksum section CS.

Next, in step S222, the MCU 10 determines whether the checksum calculated from the frame number obtained in step S208 and the data of 251 bytes of the payload section PL obtained in step S218 matches the checksum obtained in step S220. As a checksum, a value calculated for 251 bytes of the payload section PL except the frame number may be used (for example, a predetermined value of 1 byte may be used instead of the frame number). When the checksums match, the MCU determines that the frame FRM is detected, and performs step S224 to store the obtained data of the payload section PL in the monitor data holding section 123 of the RAM 12 as monitor data. When the checksums do not match, the MCU 10 determines that the detection of the frame FRM is failed, and performs step S230 to discard the data of the obtained payload section PL.

That is, in step S222, the MCU 10 determines whether the 251 bytes of data of the obtained payload section PL is stored in the RAM 12 as monitor data, depending on whether the checksums match or do not match. Accordingly, frame synchronization is performed by determining whether all of the value of the header section HD, the value of the frame number, and the value of the checksum in the frame FRM match to the corresponding predetermined values. As described above, by determining whether the obtained data of the payload section PL is monitor data using a checksum, the accuracy of detecting the monitor data can be improved, and the possibility of false detection of the monitor data can be reduced.

In step S224, the MCU 10 stores the 251 bytes of data of the payload section PL obtained in step S218 as monitor data in the monitor data holding section 123 of the RAM 12. The monitor data stored in the monitor data holding section 123 of the RAM 12 is subsequently transmitted to the optical transmission device via the I²C bus by the MCU 10. Alternatively, the monitor data is stored in an area provided in the RAM 16 for monitor. The monitor data holding section 123 is overwritten by the monitor data retrieved from the newly received frame FRM. Next, in step S226, the MCU 10 updates the frame number held in the frame number holding section 122 using the 1 byte data (the second data) obtained in step S208. That is, the MCU 10 rewrites (updates) the frame number (update data) held in the frame number holding section 122, which is the frame number used in the next receiving operation, to the 1 byte data (the second data) obtained in step S208. When the frame number holding section 122 is rewritten, "1" may be previously added to the 1 byte data obtained in step S208, and the added value may be set as an expected value of the frame number of the frame FRM to be received next. Then, it may be determined whether the newly obtained value of the frame number in step S220 matches the expected value held in the frame number holding section 122.

Next, in step S228, the MCU 10 stores "0" in the frame error flag holding section 121 because the receiving operation of the monitor data succeeded by frame synchronization, and performs step S204 to obtain the next 2 bytes to receive the next frame FRM.

In step S230, the MCU 10 discards the data obtained as the payload section PL in step S218. Next, in step S232, the MCU 10 stores "1" in the frame error flag holding section 121 because the frame synchronization and the receiving operation of monitor data failed, and performs step S204 to obtain the next 2 bytes.

[Transmitting and Receiving Operation of Frame Including Monitor Data]

FIG. 5 is a diagram illustrating an example of transmitting and receiving operation of a frame FRM including monitor data between the optical transceivers 100 of FIG. 1. In practice, the optical transceiver 100 transmits and receives the frame FRM containing Manchester-encoded monitor data, but here, for the sake of clarity, values before encoding and after decoding the Manchester code are illustrated. The values illustrated in FIG. 5 are illustrated in decimal. For example, the operation illustrated in FIG. 5 is implemented when the MCU 10 performs a control program.

The MCU 10 of the optical transceiver 100 at the transmitting end that transmits the frame FRM sequentially transmits the frame FRM containing monitor data to the optical transceiver 100 at the receiving end while updating the frame number according to the operation described in FIG. 3. In FIG. 5, only the frame number transmitted by the optical transceiver 100 at the transmitting side is illustrated. The MCU 10 of the optical transceiver 100 at the receiving end sequentially receives the frame FRM containing monitor data by performing the operation described in FIG. 4.

In FIG. 5, the receiving operation OP (OP1 to OP9) of the 9 frames FRM is illustrated. The frame number holding section 122 and the frame error flag holding section 121 of the RAM 12 of the optical transceiver 100 at the receiving side hold, for example, the frame number of "255" and the frame error flag of "1" in the initial state. Hereinafter, the operation of the MCU 10 of the optical transceiver 100 at the receiving end will be described. Hereinafter, the reception buffer section 124 illustrated in FIG. 1 will be described as holding a value obtained by converting each 8 bits from the first bit of the bit string into 1 byte, when the value of the received header section HD matches the value of the header section HD (synchronization pattern).

First, in the receiving operation OP1, the MCU 10 obtains data from the reception buffer section 124 until the data of the first 2 bytes of the received byte string (that is, the reception header section 125) match the specific array (F628h) of the header section HD. When the data of the reception header section 125 match the fixed data (synchronization pattern) of the header section HD, the MCU 10 obtains the next 1 byte as the frame number. The detection of the header section HD is performed by searching the 16 bit pattern that matches the 16 bit synchronization pattern in the bit string. Here, it is assumed that, when the position of the first bit of the bit string is shifted by 1 bit to the next, the byte string held in the reception buffer section 124 is updated to the value obtained by converting each 8 bits from the new first bit into 1 byte.

The MCU 10 determines that the frame numbers do not match because the obtained frame number (="1") is not "0" that is the frame number (="255")+1 stored in the frame number holding section 122 of the RAM 12. The frame number is a value of 1 byte, thus, for example, adding 1h to FFh results in 0h, and the increase in digits is not represented. Meanwhile, because the frame error flag is "1", the MCU 10 obtains data of the next 251 bytes as the payload section PL after the bytes obtained as the frame number according to the frame format illustrated in FIG. 2. The circle illustrated in the column "payload obtainment" in FIG. 5 indicates that the payload obtaining operation is performed.

As described above, at the first receiving operation, an incorrect value and the like as the initial value of the frame number (update data) may be held in the frame number holding section 122. Even in this case, when the frame error flag is "1", the MCU 10 obtains a byte string having a predetermined length from the reception buffer section 124 as the payload section PL. Accordingly, it is possible to avoid the problem that the value of the frame number obtained from the reception buffer section 124 and the expected value calculated from the frame number (update data) held in the frame number holding section 122 do not match repeatedly, which may cause the payload section PL to be unobtainable. As a result, for example, it is possible to prevent the determination that the frame synchronization failed even though the correct frame number is received, which may cause consecutive failures of the receiving operation. Therefore, the reception frequency of the frame number can be increased.

The MCU 10 calculates the checksum of the value of the obtained frame number and the 251 bytes of data obtained as a message of the payload section PL, and compares the checksum with the 2 bytes of data obtained as the checksum section CS of the payload section PL. When the checksums match each other, the MCU 10 stores the obtained message (monitor data) of the payload section PL in the monitor data holding section 123 of the RAM 12.

The circle illustrated in the column "data storage" in FIG. 5 indicates that the message of the obtained payload section PL is stored in the monitor data holding section 123 because the checksums match. The MCU 10 stores the value of the obtained frame number (="1") in the frame number holding section 122 of the RAM 12, stores "0" indicating success of the receiving operation of the monitor data by the frame synchronization in the frame error flag holding section 121 of the RAM 12, and ends the receiving operation OP1.

In the receiving operation OP2, the MCU 10 determines that the frame numbers match because the frame number (="2") obtained after detecting the synchronization pattern of the header section HD is the same as the updated value ("1"+1="2") of the value of the frame number held in the frame number holding section 122 (="1"). The MCU 10 obtains the byte string having a predetermined length, beginning from the next byte after the obtained frame number, from the reception buffer section 124 as the payload section PL. The MCU 10 calculates the checksum of the value of the frame number confirmed to match and the 251 bytes of data obtained as the message of the payload section PL.

Because the calculated checksum matches the received checksum, the MCU 10 stores the 251 bytes of data obtained as the message of the payload section PL in the monitor data holding section 123 of the RAM 12. The MCU 10 stores the obtained frame number (="2") in the frame number holding section 122 of the RAM 12, stores "0" indicating success of the receiving operation of the monitor data in the frame error flag holding section 121 of the RAM 12, and ends the receiving operation OP2. The receiving operation OP3 is performed in the same manner as the receiving operation OP2.

In the receiving operation OP4, the frame number "4" transmitted by the optical transceiver 100 at the transmitting side is transmitted as "12" to the optical transceiver 100 at the receiving side due to, for example, a deterioration in the communication quality of the optical cable for transmitting an optical signal, and the like (due to a noise and the like).

The MCU 10 determines that the frame numbers do not match because the received frame number (="12") is not the same as the updated value ("3"+1="4") of the value of the frame number held in the frame number holding section 122 (="3"). The frame error flag held in the frame error flag holding section 121 is "0." The MCU 10 rewrites the "0" in the frame error flag holding section 121 to "1" indicating failure of the receiving operation. In this case, the MCU 10 ends the receiving operation OP4 without storing the obtained frame number (="12") in the frame number holding section 122 of the RAM 12.

Because the previous receiving operation OP4 failed, in the receiving operation OP5, the frame number held in the frame number holding section 122 is not updated. Consequently, the updated frame number output by the optical transceiver 100 at the transmitting side and the frame number held in the frame number holding section 122 do not match.

The MCU 10 determines that the frame numbers do not match because the frame number (="5") obtained after detecting the synchronization pattern of the header section HD is not the same as the updated value ("3"+1="4") of the value of the frame number held in the frame number holding section of the RAM 12 (="3"). However, because the frame error flag is "1" as it is for the receiving operation OP1, the MCU 10 obtains data having a predetermined length, beginning from the next byte after the obtained frame number, from the reception buffer section 124 as the payload section PL, assuming that the frame number may have been detected. The MCU 10 calculates the checksum of the value of the obtained frame number and the 251 bytes of data obtained as the message of the payload section PL.

In this example, because the checksum obtained by calculation and the received checksum match, the MCU 10 stores the 251 bytes obtained as the message of the payload section PL in the monitor data holding section 123 of the RAM 12. The MCU 10 stores the value of the obtained frame number (="5") in the frame number holding section 122, stores "0" indicating success of the receiving operation of the monitor data in the frame error flag holding section 121, and ends the receiving operation OP5.

Accordingly, it is possible to avoid useless operation of ending the receiving operation OP5 without obtaining the received monitor data even though the correct monitor data is received. Further, it is possible to avoid the problem that the frame number updated sequentially by the optical transceiver 100 at the transmitting side and the expected value calculated from the frame number held in the frame number holding section 122 do not match repeatedly. As a result, it is possible to prevent consecutive failures of the receiving operation even though the correct frame number is received. Therefore, the reception frequency of the identification data can be increased.

The receiving operation OP6 is performed in the same manner as the receiving operation OP2. In the receiving operation OP7, the MCU 10 determines that the frame numbers match because the frame number (="7") obtained after detecting the synchronization pattern of the header section HD is the same as the updated value ("6"+1="7") of the value of the frame number held in the frame number holding section 122 of the RAM (="6"). The MCU 10 obtains the byte string having a predetermined length, beginning from the next byte after the obtained frame number, from the reception buffer section 124 as the payload section PL. The MCU 10 calculates the checksum of the obtained frame number and the 251 bytes of data obtained as the message of the payload section PL.

In the receiving operation OP7, because the calculated checksum and the received checksum do not match, the MCU 10 discards the 251 bytes of data obtained as the payload section PL (that is, does not store the data in the monitor data holding section 123). The MCU 10 does not update the frame number held in the frame number holding section 122. The MCU 10 stores "1" indicating failure of the receiving operation of the monitor data in the frame error flag holding section 121, and ends the receiving operation OP7.

In the receiving operation OP8, the MCU 10 determines that the frame numbers do not match because the frame number (="8") obtained after detecting the synchronization pattern of the header section HD is not the same as the updated value ("6"+1="7") of the value of the frame number held in the frame number holding section 122 of the RAM 12 ("6"). Thereafter, the receiving operation OP8 is performed in the same manner as the receiving operation OP1. As a result, "8" is stored in the frame number holding section 122, and "0" indicating success of the receiving operation of the monitor data is stored in the frame error flag holding section 121. The receiving operation OP9 is performed in the same manner as the receiving operation OP2.

In the example illustrated in FIG. 5, the MCU 10 stores the frame number obtained in the receiving operation in the frame number holding section 122, and compares the frame number obtained in the next receiving operation with the value obtained by incrementing the value of the frame number in the frame number holding section 122 by "1". Note that, the MCU may previously store the value obtained by incrementing the value of the frame number obtained in the receiving operation by "1", as an expected value in the frame number holding section 122. In this case, the MCU 10 compares the frame number obtained in the next receiving operation with the frame number held in the frame number holding section 122. By comparing the frame number obtained in the next receiving operation with the frame number held in the frame number holding section 122, the MCU 10 determines whether the second data and the update data satisfy the relationship based on the rule for updating the identification data.

As described above, in the present embodiment, when the data following the detected header match the expected value of the frame number that is updated with each transmission, a predetermined number of data following the data that is the expected value is stored as the monitor data. Accordingly, the detection accuracy of the monitor data can be improved compared to the case in which the monitor data are detected only by matching of the header section. Also, the possibility that the combined data of the header and the frame number are included in the monitor data is lower than the possibility that only the header data are included in the monitor data. Accordingly, it is possible to reduce the possibility that data in the monitor data are falsely detected as the header and the frame number. As a result, even when the percentage of the monitor data in the byte string having a fixed length is large, the monitor data superimposed on the optical signal can be correctly received without performing scrambling.

Although embodiments and the like of the present disclosure are described, the present disclosure is not limited to the embodiments and the like described above. Various changes, modifications, substitutions, additions, deletions, and combinations are possible within the scope of the claims, and are of course within the scope of the present disclosure.

What is claimed is:

1. An optical transceiver for receiving an optical signal on which a monitor signal is superimposed, the optical transceiver comprising:
    an extractor configured to extract the monitor signal from the optical signal received; and
    a reception processor configured to reproduce monitor data from the monitor signal extracted by the extractor, wherein
    the monitor signal includes a frame including, in this order, a header section comprised of specific fixed data, an identification section comprised of identification data updated based on a predetermined rule for each transmission of the monitor signal, and a payload section including the monitor data,
    the reception processor includes a memory for storing update data having a same byte length as the identification data,
    the reception processor generates a bit string from the monitor signal extracted by the extractor, and searches for the fixed data in a byte string generated from the bit string,
    the reception processor extracts, in a case where first data that match the fixed data are detected, second data following the first data and having a same byte length as the identification data from the byte string, and
    the reception processor extracts, in a case where the second data and a value obtained by changing the update data based on the predetermined rule match, the monitor data from the byte string by determining that data following the second data are the payload section, and updates the update data with the second data and stores the updated update data in the memory.

2. The optical transceiver according to claim 1, wherein the reception processor continues to search for the fixed data in data that follow data corresponding to the second data in the bit string, in a case where the second data and the update data changed based on the predetermined rule do not match.

3. The optical transceiver according to claim 1,
    wherein the frame further includes a checksum section immediately after the payload section, in which a checksum calculated using data of the identification section and data of the payload section is positioned,
    wherein the memory further includes a monitor data holding section capable of storing payload data having a same byte length of the payload section,
    wherein the reception processor extracts, in a case where the second data and a value obtained by changing the update data based on the predetermined rule match, extraction data having a same byte length as the payload section and checksum data having a same byte length as the checksum section from data following the second data of the byte string,
    wherein the reception processor extracts the extraction data as the monitor data and stores the monitor data in the monitor data holding section as the payload data, in a case where a checksum calculated using the second data and the extraction data match the checksum data, and
    wherein the reception processor discards the extraction data, in a case where the checksum calculated using the second data and the extraction data do not match the checksum data.

4. The optical transceiver according to claim 3,
    wherein the memory further includes a reception flag holding section indicating whether the detection of the frame succeeded or failed, wherein the reception processor extracts, in a case where the reception flag holding section indicates that a previous detection of the frame failed, the extraction data and the checksum data also in a case where the second data and a value obtained by changing the update data based on the predetermined rule do not match, and wherein the reception processor determines whether to store the extraction data in the monitor data holding section as the payload data depending on whether the checksum calculated using the second data and the extraction data match the checksum data.

5. The optical transceiver according to claim 1, wherein the reception processor changes the update data based on the predetermined rule by calculating using a predetermined function that is also used in an optical transceiver for transmitting the monitor signal.

6. The optical transceiver according to claim 1, wherein the identification data is a frame number for identifying the frame.

7. The optical transceiver according to claim 1, wherein when the reception processor searches for the fixed data in the byte string generated from the bit string, the reception processor shifts a position of a first bit in the byte string generated from the bit string by 1 bit until the first data that match the fixed data are detected in the byte string to generate a new byte string.

8. The optical transceiver according to claim 1, further comprising a transmitter for transmitting the optical signal on which the monitor signal including the frame is superimposed.

9. The optical transceiver according to claim 8, wherein the transmitter generates the monitor signal by amplitude modulation based on data composed of the frame.

10. The optical transceiver according to claim 1, wherein the monitor data includes a monitor value that reflects a change occurred in at least one of an operating environment or an operating condition of the optical transceiver, and the monitor data is stored in the payload section without scramble processing.

11. A method for controlling an optical transceiver for receiving an optical signal on which a monitor signal is superimposed, wherein the monitor signal includes a frame including, in this order, a header section comprised of specific fixed data, an identification section comprised of identification data updated based on a predetermined rule for each transmission of the monitor signal, and a payload section including monitor data, wherein the optical transceiver includes a memory for storing update data having a same byte length as the identification data, wherein the method comprises:

extracting the monitor signal from the optical signal received; and reproducing the monitor data from the extracted monitor signal, and wherein the reproducing the monitor data includes:

generating a bit string from the monitor signal extracted;

searching for the fixed data in a byte string generated from the bit string;

extracting, in a case where first data that match the fixed data are detected, second data following the first data and having a same byte length as the identification data from the byte string; and extracting, in a case where the second data and a value obtained by changing the update data based on the predetermined rule match, the monitor data from the byte string by determining that data following the second data are the payload section, and updating the update data with the second data and storing the updated update data in the memory.

* * * * *